(No Model.) 3 Sheets—Sheet 1.
D. C. CHADDOCK, C. E. SUTTON & A. C. McCULLOUGH.
COMBINED HAY RAKE AND LOADER.
No. 445,541. Patented Feb. 3, 1891.
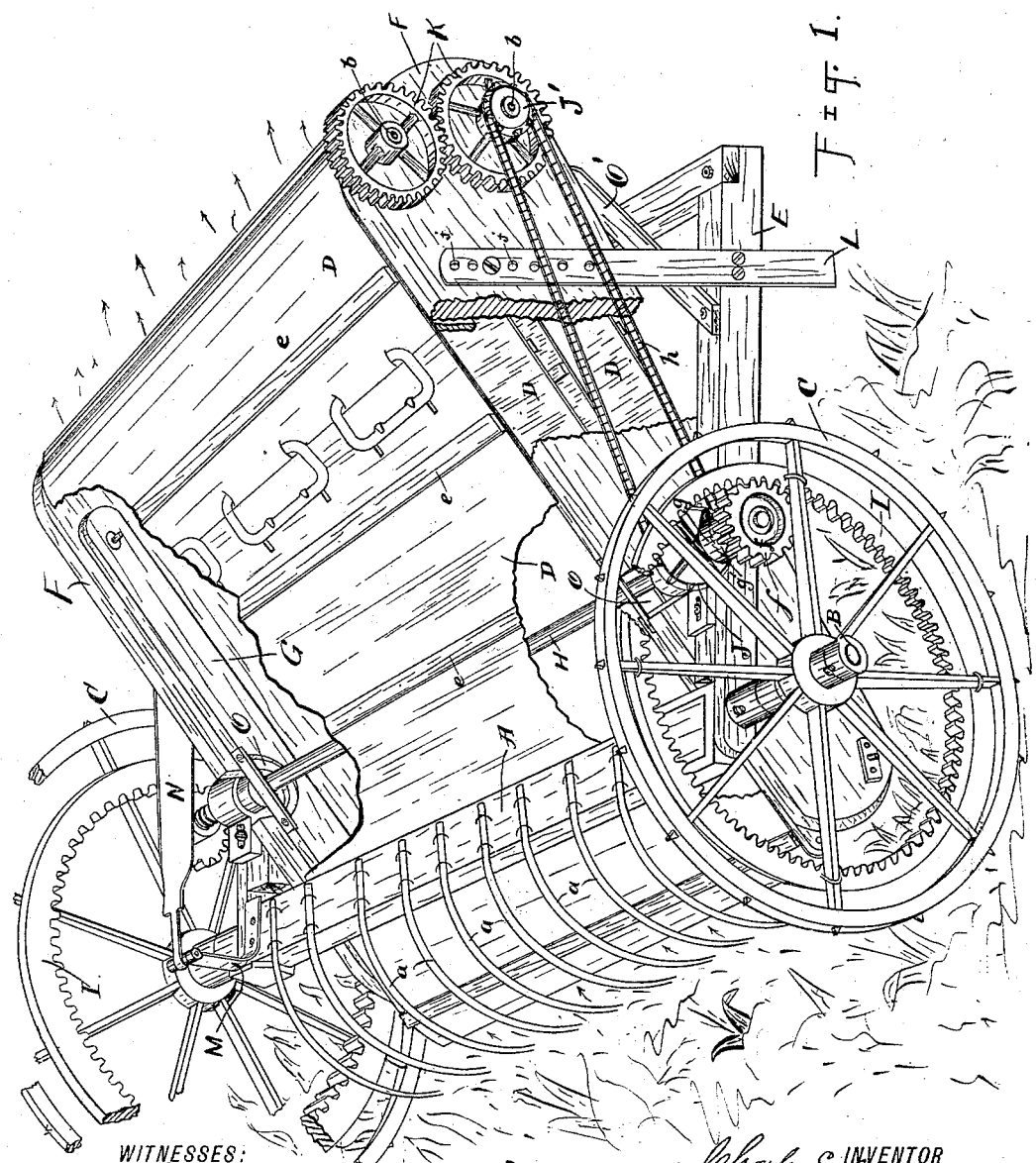

(No Model.) 3 Sheets—Sheet 2.
D. C. CHADDOCK, C. E. SUTTON & A. C. McCULLOUGH.
COMBINED HAY RAKE AND LOADER.
No. 445,541. Patented Feb. 3, 1891.
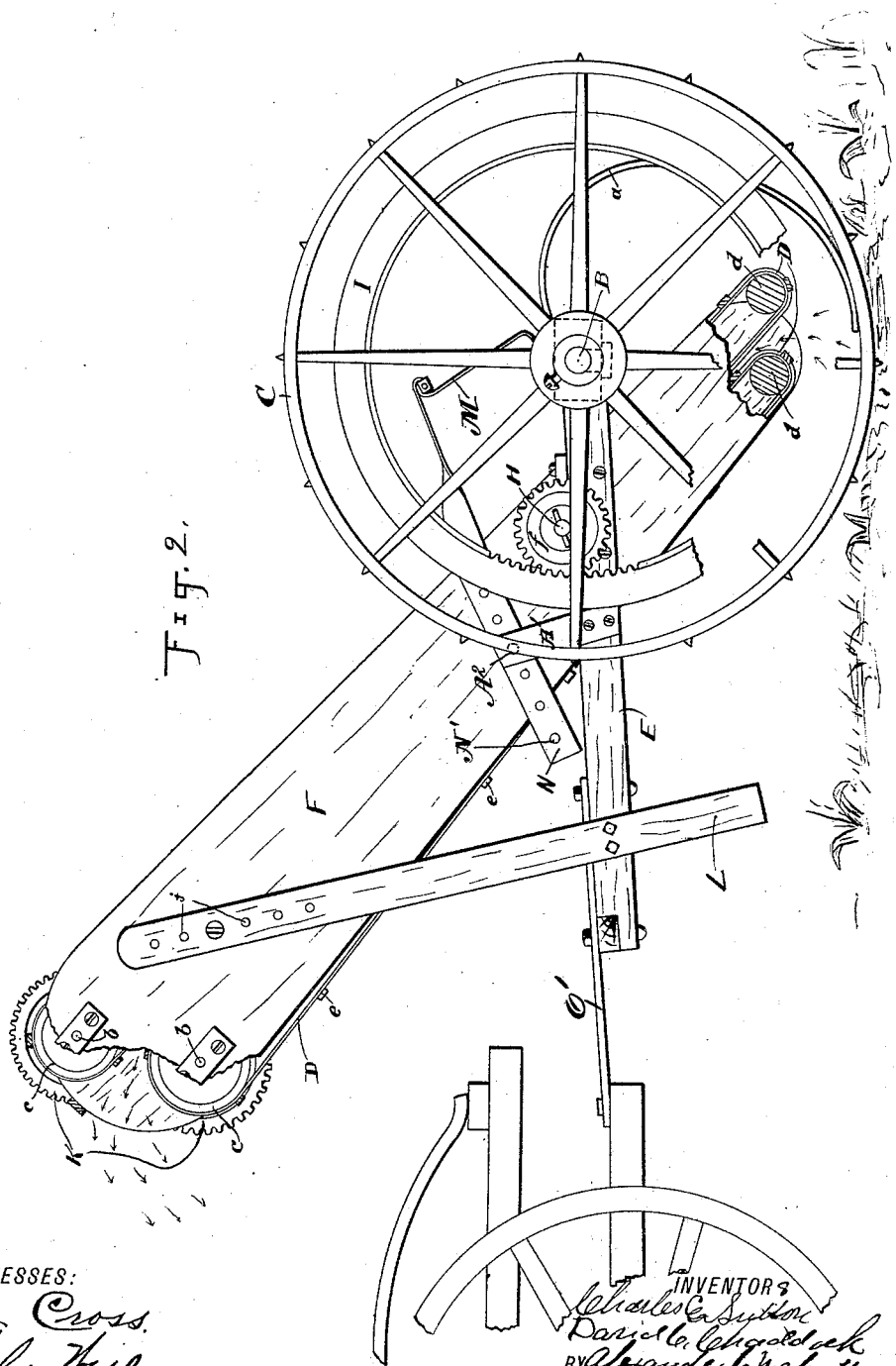
WITNESSES:
C. J. Cross.
Charles Wise.
INVENTORS
Charles E. Sutton
Daniel C. Chaddock
By Alexander C. McCullough
Fred M. Bond
ATTORNEY.

(No Model.) 3 Sheets—Sheet 3.
D. C. CHADDOCK, C. E. SUTTON & A. C. McCULLOUGH.
COMBINED HAY RAKE AND LOADER.
No. 445,541. Patented Feb. 3, 1891.
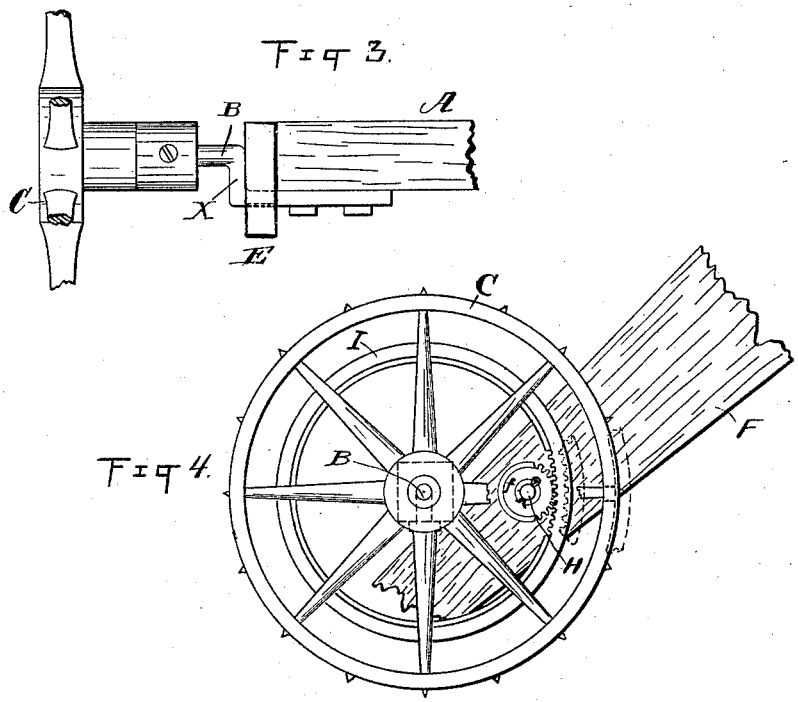
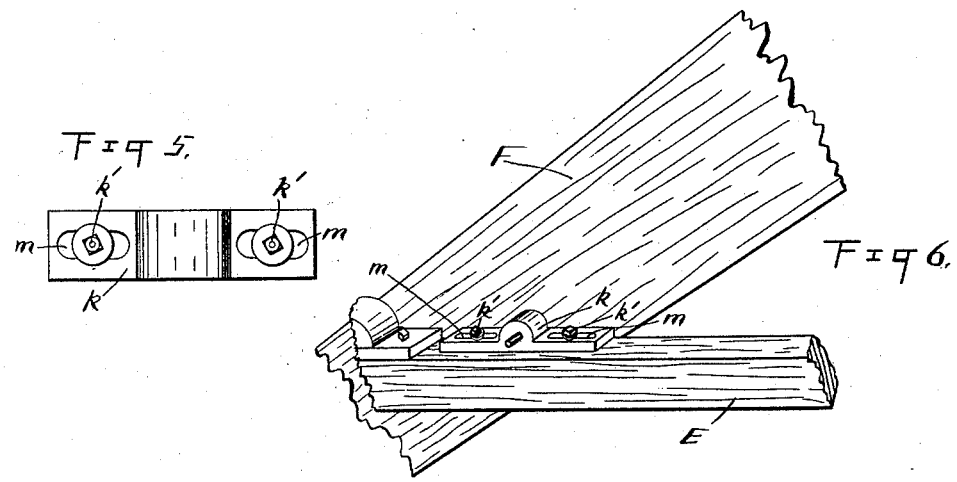
WITNESSES:
INVENTORS
ATTORNEY.

UNITED STATES PATENT OFFICE.

DAVID C. CHADDOCK, OF MINERVA, CHARLES E. SUTTON, OF RICHMOND, AND ALEXANDER C. McCULLOUGH, OF KNOXVILLE, OHIO.

COMBINED HAY RAKE AND LOADER.

SPECIFICATION forming part of Letters Patent No. 445,541, dated February 3, 1891.

Application filed June 16, 1890. Serial No. 355,699. (No model.)

*To all whom it may concern:*

Be it known that we, DAVID C. CHADDOCK, a resident of Minerva, Stark county, CHARLES E. SUTTON, a resident of Richmond, Jefferson county, and ALEXANDER C. McCULLOUGH, a resident of Knoxville, Jefferson county, Ohio, all citizens of the United States, have invented certain new and useful Improvements in a Combined Hay Rake and Loader; and we do hereby declare that the following is a full, clear, and exact description of the same, reference being had to the annexed drawings, making a part of this specification, and to the letters of reference marked thereon, in which—

Figure 1 is a perspective view. Fig. 2 is a side elevation showing the rake attached to the rear end of a wagon. Fig. 3 is a detached view of a portion of the rake-head, showing one of the wheel-axles attached thereto. Fig. 4 is a side view of one of the propelling-wheels, showing a portion of said wheel in dotted lines to illustrate its position when thrown out of gear. Fig. 5 is a detached side view of the frame-retaining bar, showing the clamping-bolts. Fig. 6 is a view showing the frame-retaining bar properly attached.

The present invention has relation to combined hay rakes and loaders; and it consists in the different parts and combination of parts hereinafter described, and particularly pointed out in the claims.

Similar letters of reference indicate corresponding parts in all the figures of the drawings.

In the accompanying drawings, A represents the rake-head, to which are attached in any convenient and well-known manner the rake-teeth $a$, which teeth are of the usual kind.

To the ends of the rake-head A are securely attached the wheel-axles B, which axles receive and hold the traveling wheels C. For the purpose of throwing the elevating-webs D in and out of gear the wheel-axles B are bent upward, as illustrated at X, Fig. 3, and the rear ends of the frame E are pivotally attached to said wheel-axles below the portion of said axles upon which the traveling wheels C revolve.

To the frame E are adjustably attached the inclined side pieces F, as hereinafter described, said side pieces being located substantially as illustrated in the drawings. To the top or upper ends of the side pieces F are journaled the shafts $b$, to which shafts are securely attached the rollers $c$. To the bottom or lower ends of the side pieces F is journaled the roller $d$, the roller $d'$ being journaled to the pivoted bars G, which bars are pivotally attached at their top or upper ends to the side pieces F, substantially as illustrated in Fig. 1. Upon the rollers $c$, $d$, and $d'$ are located the elevating webs or canvas D. These elevating-webs D are located one above the other, substantially as illustrated in the drawings, and are so located for the purpose hereinafter described. To these elevating-webs D are attached in any convenient and well-known manner the cleats $e$.

To the frame E is journaled the shaft H, which shaft is located a little in front of the wheels C and passing through side pieces F. To the ends of the shaft H are loosely attached the pinions $f$, which pinions mesh with the cogged ring I, said cogged ring being located upon the spokes of the wheels C and concentric with the rim thereof.

J is a sprocket-wheel loosely mounted on the shaft H, and J' another sprocket-wheel mounted on a shaft $b$ at the upper end of the side pieces F.

For the purpose of permitting the pinions to turn backward or stopping while turning the loader proper at an angle the ratchet-collars $g$ and $g'$ are provided, the collar $g$ being secured to the sprocket-wheel J, while the collar $g'$ is securely attached to the shaft H. For the purpose of communicating rotary motion to the rollers $c$ the drive-chain $h$ is provided, which leads from the sprocket-wheel J to the sprocket-wheel J'.

For the purpose of communicating motion to the elevating webs or canvas D the intermeshing cog-wheels K are provided, which cog-wheels are securely attached in any convenient and well-known manner to the shafts $b$. For the purpose of securely holding the inclined side pieces F at the desired inclination the posts or standards L are provided, and for the purpose of adjusting the side pieces F, together with their different attachments, the posts or standards L are provided with a series of apertures $i$, through any one of which and a hole in the side pieces a pin is adapted to be passed.

For the purpose of changing the point of attachment of the side pieces F to the frame E the slotted retaining-bars $k$ are provided. These retaining-bars are bolted or otherwise attached to the side pieces F and to the frame E.

It will be understood that the clamping-bolts $k'$ are for the purpose of securely holding the slotted retaining-bars $k$ to the frame E, and when said clamping-bolts are loosened the retaining-bars $k$ are free to be moved back and forth within the limits of the slots $m$.

For the purpose of throwing or elevating the rake-teeth $a$ up and out of operation the arm M is provided, which arm is securely attached to the rake-head A in any convenient and well-known manner. To the top or upper end of the arm M is pivotally attached the connecting-rod N, which connecting-rod is provided with a series of holes N', whereby it may be adjusted with relation to the post A' on the frame E by means of the pin $A^2$.

It will be understood that as the connecting-rod N is drawn forward it will elevate the rake-teeth $a$ by means of the rocking movement of the rake-head A and at the same time pull the traveling wheels C forward, as illustrated in Fig. 4, which disconnects the pinions $f$ from the cog-rings I, thereby stopping the movements of the elevating webs or canvas D.

For the purpose of permitting large bunches of hay to enter between the elevating-webs D the pivoted bars G are provided, which permit the top or upper web to move upward and from the lower elevating-web.

For the purpose of permitting the pivoted bars G to vibrate, the notch O is provided, through which passes the shaft H. For the purpose of attaching the loader proper to the rear end of a wagon, the bar O' is provided, which is securely fastened to the front end of the frame E and may be of any desired form, reference being had to properly attaching the loader to a wagon.

In the drawings the elevating-webs D are shown substantially of the same length; but it will be understood that hay or like material can be elevated if the upper web stops or does not extend the full length of the lower web.

Having fully described our invention, what we claim as new, and desire to secure by Letters Patent, is—

1. In a hay rake and loader, the combination of the rake-head A, having attached thereto the teeth $a$, the wheel-axles B, attached to the rake-head A, the frame E, having journaled thereto the shaft H, carrying the pinions $f$ and the ratchet-collars $g\ g'$, the elevating-webs D, located one above the other, and means for operating the same, substantially as described.

2. In a hay rake and loader, the combination, with the rake-teeth at the rear of the device, of the upper and lower elevating-webs D and the side pieces supporting said webs, said side pieces pivoted at their middle portion to the machine-frame, and capable of a longitudinal adjustment, substantially as described.

3. In a hay rake and loader, the combination of the rake-head A, having teeth $a$, the frame E, having adjustably attached thereto the inclined side pieces F, rollers $c$, $d$, and $d'$, located at top and bottom of the side pieces, the elevating-webs D, intermeshing cog-wheels on the rollers $c$, and an endless chain $h$, connected by intermediate gearing with the wheel C and imparting motion to one of said cog-wheels, substantially as described.

4. In a hay rake and loader, the combination, with the rake-head having teeth attached thereto, the frame E, carrying elevating-webs D, and the main wheels C, of a bent axle B, connecting the rake-head and wheels, the arm M, and the connecting-rod N for varying the position of the rake-head and wheels with respect to the frame E, substantially as described.

In testimony that we claim the above we have hereunto subscribed our names in the presence of witnesses.

DAVID C. CHADDOCK.
CHARLES E. SUTTON.
ALEXANDER C. McCULLOUGH.

Witnesses as to David C. Chaddock:
  F. W. BOND,
  E. A. C. SMITH, Jr.

Witnesses as to Charles E. Sutton and Alexander C. McCullough:
  A. B. GRAHAM,
  J. C. BERESFORD.